United States Patent [19]
Cooperman

[11] 4,150,335
[45] Apr. 17, 1979

[54] HIGHLY RELIABLE DISTRIBUTION CONTROL UNIT WITH IMPROVED CONTROL CAPABILITY

[75] Inventor: Richard S. Cooperman, Silver Spring, Md.

[73] Assignee: Communications Satellite Corporation, Washington, D.C.

[21] Appl. No.: 826,624

[22] Filed: Aug. 22, 1977

[51] Int. Cl.² .......................... H04B 1/40; H04B 7/14
[52] U.S. Cl. .................................. 325/4; 343/100 ST
[58] Field of Search .................................. 325/1, 3, 4; 343/100 ST, 100 CS, 176, 178, 179, 204; 333/7 D, 84 M; 179/18 GE, 18 GF

[56] References Cited

U.S. PATENT DOCUMENTS

| | | | |
|---|---|---|---|
| 3,711,855 | 1/1973 | Schmidt | 343/100 ST |
| 3,813,497 | 5/1974 | Wachs | 179/18 GF |
| 3,833,866 | 9/1974 | Boutelant | 333/7 D |
| 3,842,350 | 10/1974 | Gross | 325/4 |
| 3,928,804 | 12/1975 | Schmidt | 325/4 |
| 4,004,098 | 1/1977 | Shimasaki | 325/4 |

OTHER PUBLICATIONS

*A Satellite-Switched SDMA/TDMA System for Wideband Multibeam Satellite*, IEEE International Conference on Comm. Schmidt-Cooperman, vol. 1, pp. 12-7-12-11.

Primary Examiner—Robert L. Richardson
Assistant Examiner—Michael A. Masinick
Attorney, Agent, or Firm—Sughrue, Rothwell, Mion, Zinn and Macpeak

[57] ABSTRACT

An SS-TDMA satellite system providing uplink and downlink interconnections through an on-board microwave switching matrix controlled by an on-board distribution control unit responsive to ground command signals. The distribution control unit is configured to permit both point-to-point and point-to-multipoint interconnections of uplinks to downlinks through the switching matrix with the satellite system operating in the dynamic TDMA mode.

5 Claims, 2 Drawing Figures

HIGHLY RELIABLE DISTRIBUTION CONTROL UNIT WITH IMPROVED CONTROL CAPABILITY

BACKGROUND OF THE INVENTION

1. Field Of The Invention

The invention is generally in the field of communication satellites and more specifically relates to on-board satellite switched multiple access systems.

2. Description Of The Prior Art

Present commercial communications satellites function as multiple access microwave repeaters for interconnecting communications signals between several earth stations. As presently constituted, communication satellites use a global coverage antenna common to multiple transponders, each comprised of a receiver and a transmitter. Generally, frequency modulated communications signals are transmitted between the earth stations and the satellite using frequency division multiple access, FDMA. FDMA grants the satellite the opportunity to simultaneously carry several channels of information. Channels are defined by frequencies, and the number of channels which can be carried is limited to the frequency spectrum allocated to the satellite system. At present, satellite systems are constrained to a 500 mHz band.

Space division multiplexing, SDMA, is a known technique for expanding the available number of communications channels. In an SDMA system narrow beam, directional antennas, known as spot beam antennas, are dedicated to specific geographical zones, with one or more earth stations being assigned to each zone. For each geographical zone, there is an uplink with its corresponding satellite on-board spot beam receive antenna and a downlink with its corresponding satellite on-board spot beam transmit antenna. A transponder is provided for each common zone uplink and downlink antenna pair. While the uplink and downlink for a geographical zone may be served by separate receive and transmit spot beam antennas, a single spot beam antenna can replace the two separate antennas. When a single spot beam antenna is used, the uplink and downlink signals are distinguished using conventional diversity techniques, such as frequency or polarization diversity.

In the simplest form of an SDMA system, the interconnections between uplinks and the downlinks are fixed. Considering four uplinks A, B, C and D and four downlinks W, X, Y and Z, a fixed interconnection system would have, for example, uplink A connected to downlink W, uplink B connected to downlink X, uplink C connected to downlink Y and uplink D connected to downlink Z.

Greater flexibility is achieved if the interconnections between uplinks and downlinks can be varied at will. Such an arrangement, known as a satellite switched multiple access system is described in U.S. Pat. No. 3,711,855, Schmidt, et al., issued Jan. 16, 1973, and U.S. Pat. No. 3,928,804, Schmidt, et al., issued Dec. 23, 1975. Such satellite systems operate in time division multiple access, TDMA, and are thus denoted SS-TDMA systems, meaning satellite switched, time division multiple access systems.

In an SS-TDMA system, the uplinks are selectively connected to each of the downlinks through a matrix of microwave switches. An example of such a microwave switch is described in U.S. Pat. No. 3,813,497, Wachs, issued May 28, 1974. Each uplink is connected to a row of switching elements, such as PIN diodes, with each diode in a row being connected via matrix columns to a downlink. The earth stations are operated in a time division mode sending their communications signals to the satellite in designated time slots in accordance with the signal destinations. Earth station transmissions are synchronized to the satellite on-board switching of the matrix crosspoint switching elements so that communications signals from the earth stations are directed to the proper downlinks.

Conventional SS-TDMA systems are presently configured for international telecommunications using point-to-point interconnections. Point-to-point means that at any moment, each uplink communications signal connects to a single downlink. That is, at any moment in time, only one crosspoint for each row may be conductive. This arrangement distinguishes from the broadcast concept of earth station interconnection through a satellite link. Under the broadcast concept, also referred to as point-to-multipoint communication, an earth station communicates with several other earth stations simultaneously. In conventional FM/FDMA systems, broadcast-type interconnections are easily effected since global coverage antennas are used. Each earth station may simultaneously receive and recognize all satellite relayed signals since these signals transmitted by global coverage antennas are frequency discriminated. A similar broadcast capability is inherent in TDMA systems using global coverage antennas. However, once the satellite is configured to operate in the SS-TDMA mode by providing the satellite with spot beam antennas, known switching systems preclude broadcast interconnection since only point-to-point interconnection is feasible.

In applicant's co-pending application Ser. No. 826,625, filed Aug. 22, 1977, an improved SS-TDMA system is described wherein point-to-multipoint interconnection capability is provided during, what is termed, static mode operation. As explained in said copending application, operational satellites function in FM/FDMA using global coverage antennas to communicate between the earth stations and the satellite. In such systems, signal discrimination is based solely on frequency diversity. TDMA satellites will be the next generation operational satellites, with such satellites operating in SS-TDMA. However, during the changeover period when both FDMA and TDMA will be used, satellites will be required to provide broadcast capability for FDMA signals as well as point-to-point dynamic operating capability for TDMA communication. The broadcast capability provided in copending application Ser. No. 826,625 is quite adequate for FDMA operation and indeed defines an improvement over prior systems. However, broadcast operation in response to TDMA signals is not available in this prior system.

It has since been determined that it would be advantageous to provide an SS-TDMA system with point-to-multipoint operating capability during dynamic TDMA operation when the switching matrix interconnection pattern is subject to rapid change, such as once per frame unit. It is to such an improved system that the present invention is directed.

SUMMARY OF THE INVENTION

An SS-TDMA satellite is configured to allow both point-to-point and point-to-multipoint interconnections between the uplinks and downlinks. The satellite includes a conventional microwave switching matrix controlled by a distribution control unit. The distribution control unit generates control signals to selectively and simultaneously energize one or more of the switching elements in each row of the matrix. Point-to-point, as well as point-to-multipoint, interconnections are available while the system operates in its dynamic TDMA mode. In the dynamic mode, the distribution control unit cyclically generates control signals dictating the conductive states of the switching elements. A complete switching cycle takes place over each communication frame which is in the approximate range of from 1 to 10 milliseconds. This flexibility in matrix crosspoint switching is realized by generating a separate dynamic control word for each matrix row or shelf, as it is often termed, each control word being comprised of a number of bits equal in number to at least the number of crosspoints or junctions in the row. Each bit position is functionally dedicated to a specific crosspoint. Ground command signals control the logic states of the control word bits in a manner to permit any number of crosspoints in each row to be simultaneously rendered conductive, thus allowing broadcast-type interconnection between uplinks and downlinks.

The switching matrix control functions are divided into two functional sections. An interface/timing section provides timing and interface interconnection between the earth stations and the second functional section which provides memory for storing dynamic control words and memory control logic. In implementing the present invention, the second functional section is physically divided into a plurality of circuits, one such circuit for each matrix row. Thus, there is provided a separate dynamic control word memory and a corresponding memory control logic for each matrix row or shelf.

DESCRIPTION OF THE PREFERRED EMBODIMENT

Figure 1:
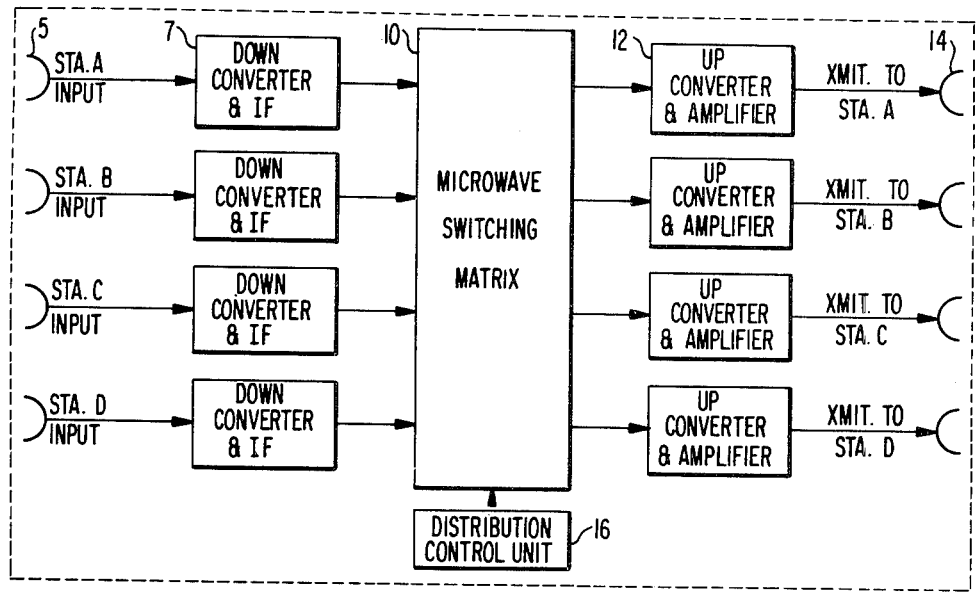
FIG. 1 is a block diagram of a conventional satellite switched multiple access communication satellite system employing on-board satellite switching under the control of a distribution control unit.

The basic SS-TDMA communications satellite system is illustrated in FIG. 1. In this illustration, a single earth station serves each geographical zone with an uplink and a downlink associated with each zone. Each uplink is provided with a spot beam receive antenna while each downlink is provided with a separate downlink transmit antenna. It is to be understood that a single spot beam antenna may serve both the uplink and the downlink for a given geographical zone by providing a means for distinguishing between the uplink and the downlink signals. Frequency diversity, phase diversity or polarization diversity may be used to provide the necessary distinctions. Further, it is to be understood that several earth stations may be located in a single geographical zone, with the several earth stations in a zone sharing the common uplink and downlink in a time division manner.

In operation of the SS-TDMA satellite system, an earth station communicates with the satellite over an uplink and a downlink. At the satellite, a spot beam receive antenna and a spot beam transmit antenna, which may be one in the same antenna, is dedicated to each geographical zone. Each of the earth stations A, B, C and D can have the capability of transmitting in either FDMA or TDMA. Regardless of the mode of transmission, each earth station transmits uplink signals to its respective spot beam receive antenna. These uplink signals are connected through appropriate signal conditioning circuits 7, such as down frequency converters and IF circuitry, to the microwave switching matrix 10. The microwave switching matrix comprises a series of signal conductive paths arranged in rows and columns, with each row being selectively, electrically connected to each column at the matrix crosspoints by means of suitable switching elements, such as PIN diodes. As previously noted, a suitable switching matrix is disclosed in U.S. Pat. No. 3,813,497, Wachs. Another suitable matrix is illustrated in U.S. Pat. No. 3,833,866, Boutelant, issued September 3, 1974. The Boutelant matrix array is arranged in a shelf configuration wherein each row of crosspoint diodes are situated in a separate shelf, each shelf lying in a separate plane. Thus, each matrix row is designated by a separate shelf. Hereinafter, the term shelf will be used interchangeably with the word row in relation to the microwave switching matrix. The matrix outputs are directed to the downlinks through suitable signal conditioning circuits 12, such as up frequency converters and amplifiers and spot beam transmit antennas 14.

The conductive states of the switching diodes are controlled by a distribution control unit 16 termed herein DCU. The control signals from the DCU determine the sequence and duration of connection between the inputs and outputs of the matrix 10. When operating in TDMA, the dynamic switching of the microwave switching matrix is divided into repetitive frame intervals in the approximate range of 1 to 10 milliseconds in duration. Each frame is further divided into time intervals termed frame units. A frame unit is the shortest programmable increment of time to be allocated to any particular cross connection of the satellite switching matrix and may be equal to approximately 6 microseconds in duration. The number of frame units allocated to any particular cross connection is under the control of the DCU 16. Generally, one less than the total number of frame units in every frame are allocated to communications signals. The remaining single frame unit in each frame is allocated for transmission of synchronizing signals to the earth stations. A synchronizing technique and apparatus which may be used with the system of the present invention is disclosed in the aforementioned U.S. Pat. No. 3,711,855.

Figure 2:
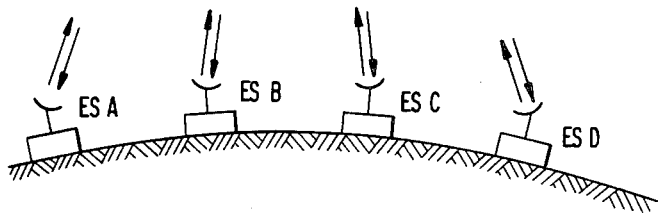
FIG. 2 is a block diagram of an improved distribution control unit according to the teachings of the present invention.
Figure 2:
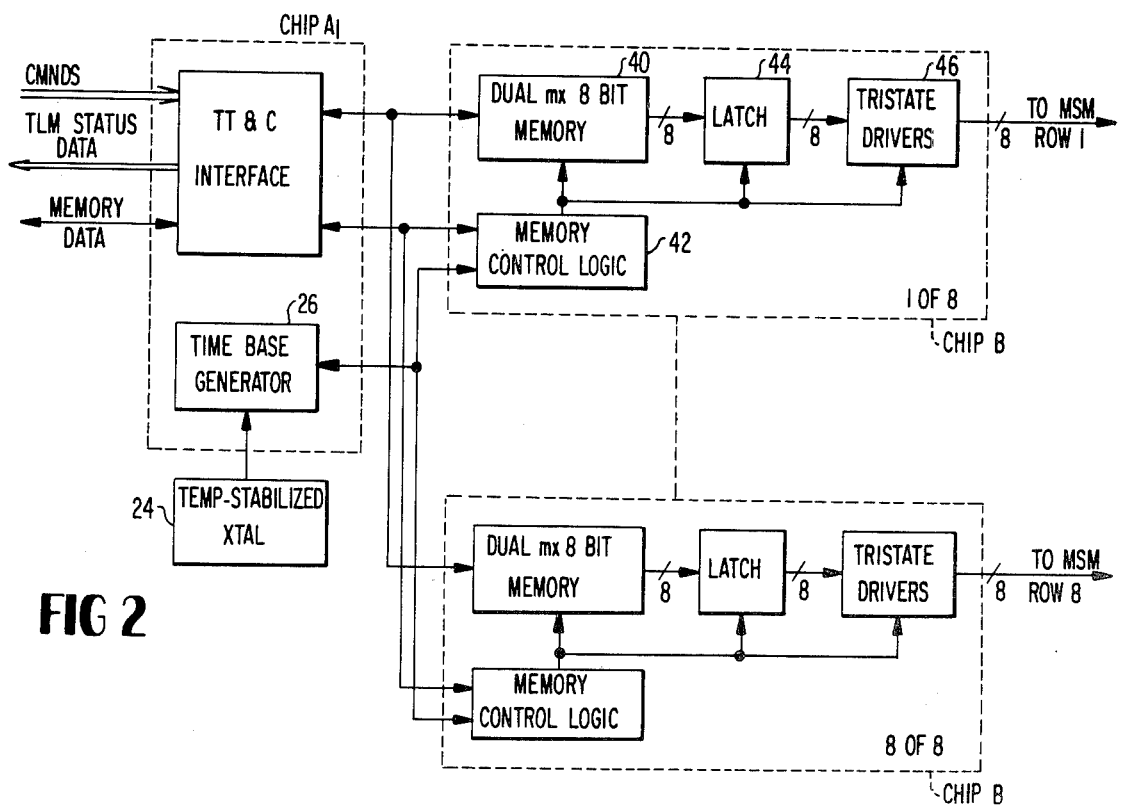

FIG. 2 is a functional block diagram of a distribution control unit, DCU, of the present invention. This DCU is particularly adapted to provide broadcast capability during SS-TDMA satellite operation. It is noted, however, that the FIG. 2 embodiment of the DCU can also provide broadcast capability in the FDMA environment. Further, the embodiment of FIG. 2 does not preclude conventional dynamic operation of the microwave switching matrix.

The DCU of FIG. 2 is divided into two functional sections. An interface/timing section is provided on two redundant identical chips A, with only one chip A being illustrated. Each chip A includes telemetry and telecommand, T & C, interface circuitry 22. The circuitry 22 functions to receive matrix interconnection patterns from the controlling earth station and transmit these patterns to dynamic control word memories 40 forming a portion of the second functional section of the DCU. In addition, the T & C interface 22 permits the received interconnection patterns to be echoed back to the earth station for verification. The T & C interface circuit is, in and of itself, conventional. Timing is provided by a highly stable crystal oscillator 24 in conjunction with time base generator 26, comprised of digital divider circuits. The internal clock provides the synchronization signals for the earth stations and controls the timing of the satellite switching matrix. This timing circuitry is duplicated on each interface/timing chip A. Thus, the chips A form an on-line/standby pair, each being fully equipped to drive the several memory/driver chips B described hereinafter.

The other functional section of the DCU comprises the memory/driver section or shelf controller circuit, as it will be termed herein. This section is physically separated into a number of identical circuits, each denoted chip B, one such circuit being associated with each matrix shelf. Significantly, the shelf controller chips B can be incorporated into the matrix shelves themselves precluding the need for complex and expensive drivers providing substantial signal amplification. It is also possible to segregate the shelf controller circuitry on discrete chips, one for each shelf.

Each chip B, there being one for each matrix shelf, is comprised of a control memory 40, a memory control logic circuit 42, latches 44 and simple, inexpensive diode drivers 46. The number of latches 44 and drivers 46 equal the number of crosspoint switching elements on a shelf, with each driver 46 being dedicated to a different crosspoint of the shelf.

Preferably, two redundant memories are provided for each shelf controller circuit, one memory operating on-line while the other off-line to receive new pattern information. The on-line memory 40 and its associated logic 42 is designed to provide simultaneous, independent dynamic control over each crosspoint within its related matrix shelf. Control data is stored as individual bits per cross-point rather than in coded form per row as is the case with previous DCU embodiments. Therefore, an 8-bit control word is provided for an 8 switch shelf, one bit for each shelf switch. This enables any number of switching elements on the shelf to be simultaneously rendered conductive. Assuming an 8 switch shelf, parallel output 9-bit control words from each shelf controller memory 40 controls the states of the respective latches 44. Drivers 46, responsive to corresponding latches 44, provide signals at proper signal levels to directly control the states of switching elements, thereby eliminating the need for complex active switching element drivers. By partitioning the DCU into interface/time base circuits A and matrix shelf controller circuits B, it is possible to replace shelves during reconfiguration in the event of failure in the microwave switching matrix or the DCU.

The DCU configuration of FIG. 2 allows point-to-multipoint inrterconnection between matrix inputs and outputs in a dynamic fashion using TDMA. During operation of this DCU, the on-line memory for each shelf stores digital dynamic control words equal in number to the number of frame units in the frame. Each dynamic control word is comprised of a number of bits equal to the number of crosspoint switching elements in the shelf. Thus, for a 750 microsecond frame containing 125, six microsecond frame units, the on-line memory for each shelf must be capable of storing 125 digital control words. Assuming an 8-by-8 switching matrix, each digital control word would be 8 bits long with each bit position being dedicated to a different switching element on a shelf. The 125 digital control words are cyclically read out and parallel accessed by latches 44. Eight latches 44 are provided for each shelf of an 8-by-8 matrix, with the logic state of a latch determining through a driver 46 the conductive state of a corresponding switching element.

Assume that the i-th bit position of each digital control word is dedicated to the i-th crosspoint switching element of a shelf. If, during a frame unit, this bit position is at a logic 1, a latch 44 associated with the i-th bit position is set to produce a logic 1 output, causing its corresponding driver 46 to generate a signal sufficient to render the i-th switching element on the shelf being controlled to switch to its conductive state. So long as a logic 1 remains in the i-th bit position of the digital control word, the i-th switching element remains conductive. Therefore, effective static operation can be realized by maintaining the logic level of selected bit positions constant.

The memory control logic 42 for each matrix shelf operates under the command of earth station signals and may be comprised of memory address counters for accessing the contents of the shelf memory in proper sequence to generate the desired switching pattern. While redundancy of memories 40 may be effected by using separate distinct memories, a single large capacity memory may be used and functionally divided into separate memory units. For example, for a 125-word switching pattern, a 250-word capacity memory can be used. The memory may be any well-known memory capable of storing the required quantity of data and of writing in and reading out the data at the required rates. Conventional random access memories (RAM) may be used. Functional redundancy is accomplished by providing the memory control 42 with separate address counters for each memory section to thereby permit the separate addressing of two memory locations simultaneoulsy. The redundant shelf controller memories may form on-line/standby pairs. When the on-line memory containing the data pattern currently being used is generating digital control words, the other memory is being reprogrammed to implement the next data traffic change. The two memories for each shelf may also be programmed with the same traffic pattern in which case the memories self-check each other. Since each shelf is provided with its own memories for storing digital control words, the memories and associated control circuitry for shelf control can be formed integral with the shelves. This eliminates the need for complex and expensive driver circuits since the close proximity of the memories and control circuits to the switching elements precludes the need for substantial signal amplification.

According to the invention, SS-TDMA satellites are configured to allow point-to-point, as well as point-to-multipoint, interconnection between the inputs and outputs of the system microwave switching matrix. Matrix crosspoint switching is controlled in response to digital control words comprised of a number of bits at least equal to the number of crosspoint switching elements to be selectively switched thereby permitting the simultaneous switching of any number of switching elements. The digital control words may be stored in separate memories, a memory being designated for each matrix row or shelf. This feature permits the memories to be made integral with the matrix shelves, thus allowing replacement of shelves during reconfiguration, and in the event of failure in the switching matrix, without interrupting traffic flow.

The herein-described invention is compatible with the requirements of an FM/FDMA, TDMA or hybrid system environment. Static operation FDMA signals can be effected by simply repeating the same dynamic control word over several frame units. Further, the partitioning of the control logic enhances overall system reliability. Thus, the invention set out in detail hereinabove improves SS-TDMA satellite system performance through increased operational flexibility and enhanced reliability.

What is claimed is:

1. In a communications satellite system of the space division-type, including spot beam antennas receiving uplink communications signal from a plurality of earth stations and transmitting said uplink signals over downlinks to said earth stations, said uplinks being communicated to said downlinks through a switching matrix forming an array of inputs and outputs interconnected in a row and column fashion through electrically controllable crosspoint switching elements, each uplink being designated to a different matrix input and each downlink to a different matrix, output, and a distribution control unit for controlling the conductive states of said crosspoint switching elements, said satellite system operable in a time division mode with uplinks communicating with downlinks in a cyclical fashion, a complete cycle occurring over a frame time, each frame being subdivided into frame units, said distribution control unit including means for dynamically varying the conductive states of said crosspoint switching elements such that a different connection pattern can occur in each frame unit, wherein the improvement comprises:
   (a) means for generating digital control words, each bit position of said words functioning to control the conductive state of a different crosspoint switching element;
   (b) a plurality of memory means, at least one such memory means being associated with each input row of said matrix, each of said memory means storing a plurality of digital control words equal in number to at least the number of frame units in the frame time, each control word containing a number of bit positions equal at least to the number of crosspoint switching elements in the input row, with which the memory is associated; and
   (c) means corresponding to each bit position of a digital control word for controlling the conductive states of the crosspoint switching elements in accordance with the value of the bit in the corresponding bit position, whereby any number of switching elements in each input row can be rendered simultaneously conductive to effect point-to-multipoint interconnection between matrix inputs and outputs during dynamic operation of the satellite system in the time division mode.

2. The satellite system of claim 1 wherein each input row of crosspoint switching elements is contained on a separate shelf, with the memory means and control means for each shelf being formed integral with the respective shelf.

3. The satellite system of claim 1 wherein each input row of crosspoint switching elements is contained on a separate shelf, said memory means and control means for each shelf being formed on a chip separate from the corresponding shelf.

4. The satellite system of claim 2 wherein the crosspoint switching elements are PIN diodes, said shelf control means including latch means, one such latch means for each PIN diode on a shelf, each latch means being controlled by a designated bit position in the digital control word.

5. The satellite system of claim 3 wherein the crosspoint switching elements are PIN diodes, said shelf control means including latch means, one latch means for each PIN diode on a shelf, each latch means being controlled by a designated bit position in the digital control word.

* * * * *